US012438324B2

(12) United States Patent
Huber

(10) Patent No.: US 12,438,324 B2
(45) Date of Patent: Oct. 7, 2025

(54) METALLIC PLUG CONNECTOR COMPONENT, AND METHOD AND DEVICE FOR PRODUCING A METALLIC PLUG CONNECTOR COMPONENT

(71) Applicant: Rosenberger Hochfrequenztechnik GmbH & Co. KG, Fridolfing (DE)

(72) Inventor: Martin Huber, Wonneberg (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 445 days.

(21) Appl. No.: 17/955,909

(22) Filed: Sep. 29, 2022

(65) Prior Publication Data

US 2023/0095527 A1 Mar. 30, 2023

(30) Foreign Application Priority Data

Sep. 29, 2021 (EP) .................................... 21199738

(51) Int. Cl.
*H01R 43/16* (2006.01)
*H01R 13/03* (2006.01)
*H01R 13/04* (2006.01)

(52) U.S. Cl.
CPC ............. *H01R 43/16* (2013.01); *H01R 13/03* (2013.01); *H01R 13/04* (2013.01)

(58) Field of Classification Search
CPC ........ H01R 13/03; H01R 13/04; H01R 43/16; H01R 113/03; H01R 113/04
USPC .......................................................... 439/886
See application file for complete search history.

(56) References Cited

U.S. PATENT DOCUMENTS 2,691,627 A * 10/1954 Johnson ............... C25D 11/022 205/121
4,943,248 A * 7/1990 Colleran ............ H01H 85/2035 439/850
5,028,492 A * 7/1991 Guenin .................... C09D 5/24 428/614
5,235,743 A * 8/1993 Endo ...................... H01R 43/16 29/874
8,940,405 B2 * 1/2015 Masago ................. H01R 13/03 428/668
8,956,735 B2 * 2/2015 Masago ................... C25D 5/34 428/668
9,692,162 B2 * 6/2017 Sunaga .................. C25D 5/505
10,665,964 B2 * 5/2020 Myer ...................... H01R 4/188
2008/0257581 A1 * 10/2008 Masago ................... C25D 5/34 174/126.2
2010/0163277 A1 * 7/2010 Masago ................. H01R 13/03 174/126.2

(Continued)

FOREIGN PATENT DOCUMENTS

CN 203936474 U * 11/2014 ............. B23D 79/00

OTHER PUBLICATIONS

European Search Report dated Mar. 18, 2022.

*Primary Examiner* — Peter G Leigh
(74) *Attorney, Agent, or Firm* — Randall Danskin P.S.

(57) ABSTRACT

The invention relates to a metallic plug connector component (1), in particular an electrical contact element, or a support sleeve, of an electrical plug connector, having a main body (3) which has been coated with a coating (2) and which has been mechanically deformed in a processing portion (4). It is provided that a surface (6, 7) of the coating (2) in the processing portion (4) has a defined surface structure (8) at least in certain portions.

19 Claims, 3 Drawing Sheets

(56) References Cited

U.S. PATENT DOCUMENTS

| | | | | |
|---|---|---|---|---|
| 2012/0138330 | A1* | 6/2012 | Masago | C25D 5/627 174/68.1 |
| 2013/0260174 | A1* | 10/2013 | Tsuru | C25D 5/505 428/646 |
| 2015/0333425 | A1 | 11/2015 | Takahashi | |
| 2016/0344127 | A1* | 11/2016 | Drew | C25D 5/605 |
| 2017/0162969 | A1* | 6/2017 | Jou | H01R 13/03 |
| 2021/0281001 | A1* | 9/2021 | Klawinski | H01R 13/426 |

* cited by examiner

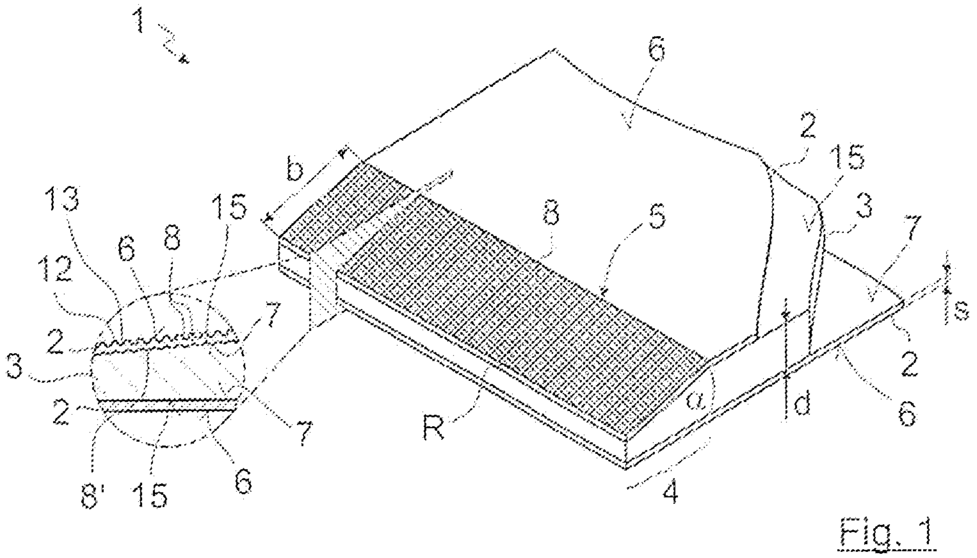
Fig. 1
Fig. 1A
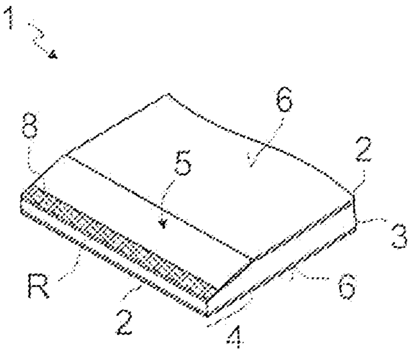
Fig. 2
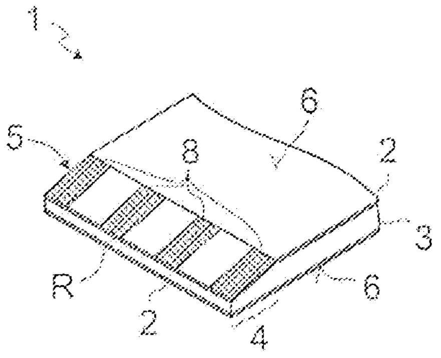
Fig. 3
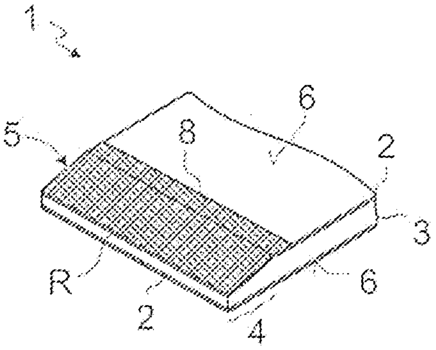
Fig. 4
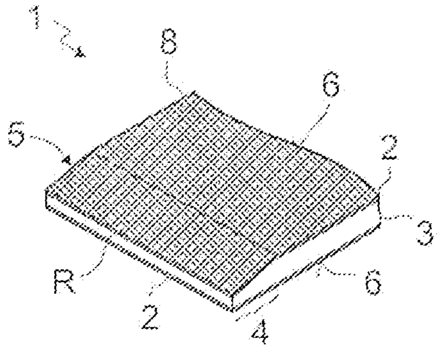
Fig. 5

METALLIC PLUG CONNECTOR COMPONENT, AND METHOD AND DEVICE FOR PRODUCING A METALLIC PLUG CONNECTOR COMPONENT

CROSS-REFERENCE TO RELATED APPLICATIONS

This US National Stage Non-Provisional Patent Application claims priority to earlier filed European Patent Application No. 21 199 738.2 which was filed on 29 Sep. 2021.

The entire contents of the aforementioned earlier filed European Application is expressly and fully incorporated herein by this reference.

Pursuant to USPTO rules, this priority claim to earlier filed European Patent Application No. 21 199 738.2, which was filed on 29 Sep. 2021, is also included in the Application Data Sheet (ADS) filed herewith.

FIELD OF INVENTION

The invention relates to a metallic plug connector component, in particular an electrical contact element or a support sleeve of an electrical plug connector, having a main body which has been coated with a coating.

The invention furthermore relates to a method and a device for producing a metallic plug connector component which has a main body which has been coated with a coating.

BACKGROUND OF THE INVENTION

An important method in the manufacturing technology sector is deformation in order, in the course of the production of parts, to targetedly impart a desired shape to the basic workpieces. Some of the most important manufacturing methods in deformation technology are rolling, open-die forging, closed-die forging, extrusion of short products, extrusion of long products, deep drawing, and bending. These are thus methods in which unprocessed parts composed of plastic materials, such as metals and thermoplastic plastics, are reshaped. This generally occurs without material being removed from the unprocessed parts. The material or the workpiece preferably maintains its mass and its cohesion.

A deformation process may be used inter alia in order to impart a bevel to sharp edges of parts in order to reduce a risk of injury or in order to simplify a subsequent assembly process. A bevel may advantageously be introduced into the part for example by way of a stamping or a pressing operation.

If the basic part is a surface-treated part, that is to say a part composed of a main body that has been coated with a coating, the deformation process can cause the coating to flow. In particular if the processing portion in which the part is deformed adjoins an edge or a margin of the part, or is arranged close to such an edge, this can have the effect that, after the deformation process, the coating projects beyond the edge of the main body. This can have various adverse consequences.

The coating projecting beyond the part can give rise to sharp edges, which can harbor a risk of injury, and the part can furthermore appear, haptically and visually, to be of low quality. It may also be the case that the projecting length of the coating protrudes as a chip ("flash") from the part, which is a problem in particular if the part is used as a component of an electrical plug connector, because the protruding chip can, for example, cause short circuits. The projecting length may possibly also detach entirely from the part, which can then adversely affect the technical cleanliness in the context of a manufacturing process.

Thus, after the deformation of surface-treated or coated parts, it is often necessary to perform secondary processing steps if it is sought to produce a part with high precision. These additional processing steps should be avoided in particular in the context of automated mass production, because such steps make the production process more expensive and lengthen the processing time.

High demands are placed in particular on components for electrical and optical plug connectors. Metallic plug connector components must therefore be produced with high precision and quality. Furthermore, for the production of plug connectors, there is often also a demand for a particularly economical manufacturing process and in particular also a short processing time, in particular in order to allow mass production.

In view of the known prior art, it is the object of the present invention to provide a metallic plug connector component which has been mechanically deformed in a coated processing portion and which can preferably be produced precisely and inexpensively in a mass production context.

The present invention is also based on the object of providing a method by means of which a metallic plug connector component which has been mechanically deformed in a coated processing portion can preferably be produced precisely and inexpensively in a mass production context.

It is furthermore an object of the invention to provide a device by means of which a metallic plug connector component which has been mechanically deformed in a coated processing portion can preferably be produced precisely and inexpensively in a mass production context.

The object is achieved by the means and structures described and disclosed herein.

This disclosure, the dependent claims and the features described herein relate to advantageous embodiments and variants of the invention.

A metallic plug connector component is provided which has a main body which has been coated with a coating.

In the context of the invention, a "plug connector component" may be an intermediate product for further processing, a (an intermediate) product for use or installation in a complex assembly of the plug connector, or an individual component of the plug connector. The plug connector component may inter alia be a part which has not yet been deformed, or has only partially been deformed, to form a sleeve-shaped body (for example a body substantially in sheet form) and which is processed further, in particular punched or deformed or bent, in a subsequent manufacturing step.

The metallic plug connector component may be usable as an independent part in the plug connector, or may be used as a component of a technical composite or of an assembly in the plug connector.

The metallic plug connector component is preferably configured as a contact part of a mechanical plug connector, of an electrical plug connector or of an optical plug connector. The metallic plug connector component may for example be configured as an electrical contact element (for example internal-conductor contact element or external-conductor contact element) or as part of an electrical contact element of an electrical plug connector. The metallic plug connector component may for example also be configured as a support sleeve, housing component or some other component of an electrical plug connector.

The metallic plug connector component may be of single-piece or multi-piece/part form.

The main body of the metallic plug connector component may be coated with the coating in fully encircling fashion, or may be coated with the coating only at individual sides (in particular at mutually opposite sides) or only at a single side. One or more sides of the main body may also be coated only in certain portions or partially. The coating preferably runs over the entirety of at least one side of the main body.

A coating in the context of the invention may be a thin layer or multiple interconnected layers that have been applied to the main body by any coating process (for example only, and without limitation, chemically, mechanically and/or thermally). The coating is preferably connected to the main body cohesively and/or in form-fitting fashion. In particular, provision may be made whereby the coating is inseparably connected to the main body such that the coating cannot be non-destructively removed from the main body.

Layer thickness of the coating is preferably less than a thickness of the underlying main body, preferably less than the thickness of the main body at least by a factor of 2, particularly preferably less than the thickness of the main body at least by a factor of 10. The layer thickness of the coating is preferably 0.1 μm to 10 μm, particularly preferably 0.5 μm to 5 μm.

The coating preferably serves for influencing physical, electrical and/or chemical characteristics of the finished plug connector component that would not arise from the uncoated main bodies. For example, a coating of a metallic plug connector component that is to be used for a plug connector may serve for reducing the electrical contact resistance and/or for targetedly defining mechanical plug-in forces by way of the frictional resistance of the coating. The coating may in particular also modify the plug connector component such that oxidation, mechanical damage and/or aging of the main body is prevented.

According to the invention, the plug connector component or the main body has been mechanically and/or plastically deformed in a processing portion.

The main body preferably has the coating at least in certain portions in, preferably over the entirety of, the processing portion.

The plug connector component or the main body may in principle have been deformed in any desired manner in the processing portion. For example, in the processing portion, there may be formed a projection, such as a rib, a ring-(segment-)shaped elevation, a flange or a convexity/bulge, a web or some other bend, or else a transition portion between two portions with respectively different radii, a stamped portion, but in particular a margin or an edge with a bevel or a transition radius ("shaped edge").

According to the invention, provision is made whereby a surface of the coating in the processing portion has a defined surface structure at least in certain portions.

In the present case, a "defined surface structure" is to be understood to mean a surface structure that has been applied to or introduced into the respective surface by intentional or targeted processing—in contrast to an undefined surface contour as a manifestation of the roughness of the surface or caused by prior processing errors, tolerances and/or defects of the surface.

The inventor has determined that a defined surface structure can prevent, or at least reduce, a flow of the surface in the processing portion during the mechanical deformation process. The coating may thus have a textured surface in order to avoid the disadvantages resulting from the flow of the coating during the deformation process, such as are known from the prior art.

It has been determined that, owing to the surface structure, a more advantageous distribution of the coating material in the processing portion can occur in the course of the deformation process, for example by virtue of the fact that the coating material can distribute into individual "coating troughs" or recesses in the surface. Furthermore, by means of the surface structure, the friction with a deformation tool and/or with the main body can be increased, and in the best case a form fit with a stamping face of a deformation tool and/or with a main body face or surface of the main body can be established.

The defined surface structure that has been introduced in the processing portion thus leads to a metallic plug connector component which has been processed in a deformation process and which can be produced with high precision and furthermore inexpensively in a mass production context.

In one advantageous refinement of the invention, provision may be made whereby the coating runs in the technical region of influence of a margin, (typically an outer margin of the plug connector component or of the main body, though optionally also an inner margin), of a projection, of a transition portion between two portions with respectively different radii (for example a step or a shoulder with conical, convex, concave or other radii), of a shaped edge, of a bend, of a radius transition, of a flange, of a convexity, of a web, of a rounding, of a bevel and/or of a transition radius, such that the coating in the context of the invention gives rise to a measurable technical effect. In particular, the coating may be arranged adjacent to or so as to adjoin, in particular so as to directly adjoin, the margin, the projection, the shaped edge, the bend and/or the transition radius.

The coating may for example extend along the margin, the projection, the shaped edge, the bend or the transition radius.

A "shaped edge" may be an edge, that has been deformed in a defined manner, or a margin, that has been deformed in a defined manner, of the plug connector component, in particular a deformed edge formed at an end or at a recess of the plug connector component, for example an edge provided with a bevel or rounding, as will be described herein.

A "bend" may be any convex or concave radius transition, such as but not limited to, a step or depression.

A "transition radius" may be any uniform or non-uniform transition from a first face of the plug connector component to a second face that is oriented at an angle with respect to the first face.

A projection may in particular be a rib (for example a rib running in a longitudinal direction of the plug connector component or in an axial direction), a ring-shaped elevation, a ring-segment-shaped elevation (within an angular segment), a flange, a web or a "punctiform" elevation (in the form of a bulge or convexity, similarly to an indentation).

A set-back portion may also be provided, typically at the surface situated opposite a projection.

A transition portion between two portions with respectively different radii may for example be a step or a shoulder, as already mentioned. Here, the transition portion may run or be oriented in a circumferential direction and/or in an axial direction.

In one advantageous refinement of the invention, provision may be made whereby the main body is formed in the manner of a plate. Preferably, the width and length of the main body that define the main surfaces of the main body are very much greater than the thickness of the main body.

The main body may in particular be a single-part body formed from a single material. The main body may however optionally also be of multi-part form and therefore have multiple materials mechanically connected to one another.

The main body may preferably be formed from a metal (in particular from a high-grade metal), though other materials may also be used in the context of the invention, such as but not limited to, plastic, glass or ceramic. The main body may preferably be formed from copper or from a copper alloy, such as brass.

In particular, provision may be made whereby the main body is formed as a sheet or in the manner of a sheet.

The main body, or the metallic plug connector component, may preferably be a punched and bent part that has been produced in a punching and bending process.

In one refinement of the invention, provision may be made whereby the coating has a lower compressive strength than the main body.

"Compressive strength" refers to the resistance of a material under the action of compressive forces. The compressive strength is the quotient of breaking load and cross-sectional area of a body (force per unit area in $N/mm^2$).

In particular if the coating has a lower compressive strength than the main body, an undesired flow of the coating material on the main body can occur during a deformation process. The invention is therefore particularly advantageously suitable for use with coating materials with only a low compressive strength.

In one refinement of the invention, provision may be made whereby the coating is an electrically conductive coating, in particular a metallic coating. In the context of the invention, it is however also possible in principle for other materials, such as a plastic, to be used as a coating.

The coating may preferably be a tin coating. In principle, however, all possible coating materials may be used, including, but not limited to, gold, silver, palladium, nickel and copper.

In one refinement of the invention, provision may be made whereby the main body is coated on at least two of its sides with the coating, in particular on two mutually averted sides, or opposite sides, in particular on the two main surfaces of a main body formed in the manner of a plate or in the manner of a sheet. The coating may then preferably be (at least partially) provided with a respective surface structure on each of these sides.

Provision may however also be made for the main body to be coated with the coating only on one side, or for more than two sides of the main body to be coated (for example all sides of the main body). It is preferably then the case that each of the sides is at least partially provided with a respective surface structure at least in the region of the processing portion.

In one refinement of the invention, provision may be made whereby the processing portion has been deformed to form at least one bevel that is formed at an edge or a margin of the metallic plug connector component, or whereby the processing portion forms or has a bevel.

In the context of the present description, a "bevel" is to be understood to mean any chamfered, rounded or stepped configuration of an edge.

The width of the bevel preferably amounts to at least one third of the thickness of the main body, preferably to at least half of a thickness of the main body.

Provision may be made whereby the bevel has a bevel angle of 10° to 80°, preferably a bevel angle of 15° to 60°.

As disclosed herein, deformation processes can be particularly advantageously used for introducing bevels. The problem of the flow of a coating is generally particularly pronounced in particular in the region of the edges or margins of the main body or of the plug connector component, for which reason the invention can be particularly advantageously suitable for such an application in order to overcome the disadvantages of the prior art.

In one refinement of the invention, provision may be made whereby that surface of the coating which has the surface structure is an outer face, averted from the main body, of the coating.

In this way, a form-fitting connection can be established with a complementary counterpart structure or negative form of a stamping face of a deformation tool. The surface structure may advantageously, in particular by means of the deformation tool itself, be introduced at least into the outer face of the coating, preferably even through the coating into the corresponding main body face of the main body and also into the main body, as will be described in more detail herein.

In one particularly advantageous refinement of the invention, provision may be made whereby that surface of the coating which has the surface structure is an inner surface, facing toward the main body or directly connected to the corresponding main body face of the main body, of the coating.

The main body preferably has a complementary surface structure (in the context of the invention, for better distinction from the surface structure of the surface of the coating, the surface structure of the main body may also be referred to as "complementary surface structure") in order to establish a form-fitting connection with the surface structure formed on the inner surface of the coating.

A form fit, or at least increased friction, between the main body and coating has proven to be particularly suitable for preventing a flow of the coating during the deformation process.

Preparations for a corresponding form fit may, in principle, be made already during the production of the metallic plug connector component and even before the deformation thereof, for example by virtue of that main body face of the main body which is to be coated firstly being provided with the complementary surface structure, following which the main body may be coated such that, during the coating process, the coating material ingresses into the surface structure of the main body, such that the surface structure is ultimately also formed on the inner surface of the coating. This process is however relatively cumbersome.

It can be much more advantageous to introduce the surface structure into the inner face of the coating and into the main body face of the main body simultaneously during the deformation process, by virtue of the outer face of the coating being provided with the surface structure such that the surface structure pushes through the coating from the outer face to the inner face of the coating, and preferably also generates the corresponding surface structure on that main body face of the main body which is connected to the inner face of the coating. In this way, a form fit can be provided on both sides, on one side between the coating and main body and on the other side between the coating and deformation tool, which can particularly effectively prevent a flow of the coating during the deformation process.

As stated above, provision may be made whereby the surface structure is arranged in the processing portion only in certain portions. The surface structure may however also be provided over the entire processing portion, and optionally even beyond the processing portion.

For example, provision may also be made whereby the surface structure is spaced apart from an edge, or from the margins of the processing portion, for example is spaced apart from the edge by at least a layer thickness of the coating or by the roughness depth of the surface structure. It is possible in this way to prevent a situation in which the introduction of the surface structure into the coating causes the coating material to in some cases still be pushed beyond the edge. A spacing of the surface structure from an edge or from the margin of the processing portion is however generally not imperatively necessary.

In one advantageous refinement of the invention, provision may be made whereby the surface structure is an ordered structure.

The surface structure may form a substantially homogeneous pattern. In particular, the surface structure may form a structure which is periodic at least in certain portions. Such structures can be easy to produce and can have reproducible characteristics. The periodic structure may for example only, and without limitation, be a line pattern, a dot pattern, a honeycomb pattern, a cross pattern or the like. The periodic structure may for example have a period length of 0.5 to 300 μm, preferably 0.1 to 100 μm, in at least one spatial direction.

In principle, any surface structures may be provided, though a cross-knurled structure has proven to be particularly advantageous. Some other ordered structure (for example a dotted pattern, a line structure, a circular structure, an undulating structure etc.) may however also be suitable for preventing the flow or a transverse movement of the coating during the deformation process.

Alternatively, a disordered structure may also be provided (similarly to the surface of sandpaper). Any isotropic or anisotropic surface may be provided.

Macroscopic surface structures, such as grooves, webs or pins, may also be provided.

The surface structure preferably has depressions ("troughs") and/or elevations ("peaks") on the surface. The depressions and elevations preferably alternate in a regular or irregular pattern on the surface.

The height difference between an elevation and a depression may for example be 0.1 μm to 50 μm, preferably 1 μm to 20 μm, particularly preferably 5 μm to 10 μm. The depressions are preferably introduced into the outer face of the coating to such a depth that the coating material presses on the opposite side, or by way of the inner surface, into the main body.

The spacing between two depressions that are separated by an elevation, or between two elevations that are separated by a depression, may for example be 1 μm to 200 μm, particularly preferably 10 μm to 100 μm, for example 50 μm to 70 μm.

In one advantageous refinement of the invention, provision may be made whereby the roughness depth (the so-called "RZ value") of the surface structure corresponds at least to half of a layer thickness of the coating.

In this way, particularly strong adhesion or lateral fixing of the coating on the main body can be made possible, which is generally already sufficient. The roughness depth of the surface structure may however in principle also be greater than half of a layer thickness of the coating or less than half of a layer thickness of the coating.

The invention also relates to a method for producing a metallic plug connector component which has a main body which has been coated with a coating, having at least the following method steps: (a) processing a main body face of the main body and/or an outer face, averted from the main body, of the coating in order to generate a defined surface structure; and (b) using at least one deformation tool to perform compressive deformation of the main body, which has been coated with the coating, in a processing portion that has the surface structure at least in certain portions.

By way of the processing of the main body face of the main body and/or of the outer face of the coating in order to generate the defined surface structure, the flow of the coating can be prevented or at least substantially prevented, whereby it is possible to produce metallic plug connector components with greater precision than before, and in particular without cumbersome secondary processing method steps. The retroactive removal of flash or chips, for example by compressed air treatment, brushing or other cleaning techniques, can be omitted, and processing time can therefore be saved. Not least, it is possible by means of the proposed method for the technical cleanliness in the production of corresponding plug connector components to be improved.

By means of the texturing or structuring of the surface, in particular if, as described herein, the stamping surface of a stamping punch is provided with a corresponding counterpart contour, it is possible to prevent the coated surface of the plug connector component from being areally concertinaed or rolled up, and thus a formation of chips can be ruled out. By means of the texturing of the surface or by means of the defined surface structure, the pressure on the plug connector component during the deformation process can be segmented, and the coating can be securely held on the main body, and not areally displaced.

The method steps of the processing of the main body face and/or of the outer face of the coating and of the compressive deformation may preferably be performed at the same time/synchronously in terms of time, though may optionally also be performed successively or sequentially.

The defined surface structure is preferably configured such that the structuring has the least possible influence on the intended functionality of the surface (for example conductivity etc.).

It is advantageously thus possible for a surface-structured stamping process for metallic plug connector components with a pre-modified surface to be provided, in particular for the stamping of bevels on punched parts.

The invention may in principle be suitable for use with any compressive deformation process, in particular a rolling process (deformation between two or more rotating rollers) or a closed-die forging process (deformation between two or more stamping punches that at least partially comprise, in negative form, the shape to be produced). Open-die forging, indentation forming or extrusion may for example also be provided as a compressive deformation process.

In one particularly preferred refinement of the invention, provision may be made whereby the deformation tool has stamping punches (also referred to as "contour punches" or "contour molds").

That stamping surface of the stamping punch which faces toward the plug connector component preferably has a negative form or counterpart structure of the surface structure in order to stamp the surface structure at least into the outer face of the coating at the same time as the compressive deformation.

The deformation tool can thus advantageously be used simultaneously as a processing tool for the introduction of the surface structure and for the deformation, which can further reduce the processing time in the production of the plug connector component.

The surface structure is preferably at least partially also stamped through the coating into the main body face of the main body and/or into the main body.

Provision may be made whereby the main body is first coated with the coating in the course of the proposed method. Corresponding coating techniques are known, and further details will therefore not be discussed in any more detail. In the context of the claimed method, the main body may however also have already been coated.

In the context of the proposed method, in a variant which is less preferred but is nevertheless claimed, provision may be made whereby the main body face of the main body is firstly provided with the surface structure or the complementary surface structure using any technique, for example by means of a stamping technique, a subtractive technique or an additive layering technique. Provision may then subsequently be made for the main body to be coated with the coating such that the coating material is distributed in the elevations and/or depressions of the surface structure of the main body and thus generates a form fit with the main body.

Provision may thus optionally be made for the deformation tool to firstly be provided, or even produced, in the course of the proposed method.

In the context of the method, provision may be made whereby the processing portion adjoins an edge or a margin of the main body. The main body may be deformed such that a bevel is formed at the edge or at the margin.

Provision may be made whereby the main body is provided with the surface structure on at least two mutually averted sides.

Provision may be made whereby the plug connector component is first deformed to form a component of the plug connector, in particular of an electrical plug connector, for example to form an electrical contact element or to form a support sleeve, in the course of the proposed method.

The invention also relates to a device for producing a metallic plug connector component which has a main body which has been coated with a coating, having (a) a processing tool that is configured to generate a defined surface structure in a main body face of the main body and/or in an outer face, averted from the main body, of the coating; and (b) at least one deformation tool for performing compressive deformation of the main body, which has been coated with the coating, in a processing portion that has the surface structure at least in certain portions.

The processing tool and the deformation tool may be mutually independent tools. The processing tool and the deformation tool may however also be the same tool, wherein a negative form of the surface structure may be formed for example on a stamping face of the deformation tool in order to stamp the surface structure into the coating at the same time as the deformation process.

The invention also relates to an electrical plug connector, wherein at least one component of the plug connector, in particular an electrical contact element or a support sleeve, is configured as a metallic plug connector component according to the embodiments disclosed herein.

Features that have been described in conjunction with one of the subjects of the invention, specifically the metallic plug connector component according to the invention, the method according to the invention, the device according to the invention or the electrical plug connector according to the invention, can also be advantageously implemented for the other subjects of the invention. Likewise, advantages that have been mentioned in conjunction with one of the subjects of the invention can be understood as also relating to the other subjects of the invention.

Additionally, it is pointed out here that expressions such as "comprising", "having" or "with" do not rule out other features or steps. Furthermore, expressions such as "a" or "the" that refer to steps or features in the singular do not rule out a plurality of features or steps—and vice versa.

It is furthermore emphasized that the values and parameters described here encompass deviations or fluctuations of ±10% or less, preferably ±5% or less, further preferably ±1% or less, and very particularly preferably ±0.1% or less, of the respectively stated value or parameter, unless these deviations are ruled out in the implementation of the invention in practice. The specification of ranges in terms of start and end values also encompasses all values and fractions that are enclosed by the respectively stated range, in particular the start and end values and a respective mean value.

Exemplary embodiments of the invention will be described in more detail below on the basis of the drawings.

The figures each show preferred exemplary embodiments in which individual features of the present invention are illustrated in combination with one another. Features of one exemplary embodiment may also be implemented separately from the other features of the same exemplary embodiment, and may accordingly be readily combined by a person skilled in the art with features of other exemplary embodiments to form further meaningful combinations and subcombinations.

SUMMARY

A principal aspect of the present invention is a metallic plug connector component (1), in particular electrical contact element or support sleeve of an electrical plug connector, having a main body (3) which has been coated with a coating (2) and which has been mechanically deformed in a processing portion (4), characterized in that a surface (6, 7) of the coating (2) in the processing portion (4) has a defined surface structure (8) at least in certain portions.

A further aspect of the present invention is a metallic plug connector component (1) characterized in that the coating (2) runs so as to adjoin a margin (R) and/or a projection (5') and/or a transition portion that is formed between two portions with respectively different radii.

A further aspect of the present invention is a metallic plug connector component (1) characterized in that the main body (3) is formed in the manner of a plate from a metal, in particular is formed in the manner of a sheet from a high-grade metal.

A further aspect of the present invention is a metallic plug connector component (1) characterized in that the coating (2) has a lower compressive strength than the main body (3).

A further aspect of the present invention is a metallic plug connector component (1) characterized in that the coating (2) is a metallic coating, in particular a tin coating.

A further aspect of the present invention is a metallic plug connector component (1) characterized in that the main body (3) is coated on at least two mutually averted sides with the coating (2), wherein the coating (2) on the two opposite sides is provided with the surface structure (8).

A further aspect of the present invention is a metallic plug connector component (1) characterized in that the processing portion (4) has been deformed to form at least one bevel (5) that is formed at a margin (R) of the metallic plug connector component (1).

A further aspect of the present invention is a metallic plug connector component (1) characterized in that that surface of the coating (2) which has the surface structure (8) is an outer face (6), averted from the main body (3), of the coating (2), wherein the surface structure (8) is configured to establish a form-fitting connection with a complementary negative form (9) of a stamping face (10) of a deformation tool (11).

A further aspect of the present invention is a metallic plug connector component (1) characterized in that that surface of the coating (2) which has the surface structure (8) is an inner surface (7), facing toward the main body (3), of the coating (2), wherein the main body (3) has a complementary surface structure (8') in order to establish a form-fitting connection with the surface structure (8) of the coating (2).

A further aspect of the present invention is a metallic plug connector component (1) characterized in that the surface structure (8) is an ordered structure, preferably a cross-knurled structure.

A further aspect of the present invention is a metallic plug connector component (1) characterized in that the roughness depth of the surface structure (8) corresponds at least to half of a layer thickness (s) of the coating (2).

A further aspect of the present invention is a method for producing a metallic plug connector component (1) which has a main body (3) which has been coated with a coating (2), having at least the following method steps: a) processing a main body face (15) of the main body (3) and/or an outer face (6), averted from the main body (3), of the coating (2) in order to generate a defined surface structure (8); and b) using at least one deformation tool (11) to perform compressive deformation of the main body (3), which has been coated with the coating (2), in a processing portion (4) that has the surface structure (8) at least in certain portions.

A further aspect of the present invention is a method characterized in that the surface structure (8, 8') is stamped at least into the outer face (6) of the coating (2), preferably is stamped through the coating (2) into the main body (3), at the same time as the compressive deformation.

An even further aspect of the present invention is a method characterized in that the processing portion (4) adjoins a margin (R) of the main body (3), wherein the main body (3) is deformed such that a bevel (5) is formed at the margin (R).

A still even further aspect of the present invention is a device (14) for producing a metallic plug connector component (1) which has a main body (3) which has been coated with a coating (2), having a) a processing tool (16) that is configured to generate a defined surface structure (8, 8') in a main body face (15) of the main body (3) and/or in an outer face (6), averted from the main body (3), of the coating (2); and b) at least one deformation tool (11) for performing compressive deformation of the main body (3), which has been coated with the coating (2), in a processing portion (4) which has the surface structure (8, 8') at least in certain portions.

These and other aspects of the present invention are more fully set forth and disclosed herein.

BRIEF DESCRIPTIONS OF THE FIGURES

In the figures, functionally identical elements are denoted by the same reference designations.

FIG. 1 shows a metallic plug connector component according to a first exemplary embodiment of the invention in a perspective illustration.

FIG. 1A is an enlarged cross-section view of a segment of the metallic plug connector component of FIG. 1 showing details thereof.

FIG. 2 shows a metallic plug connector component according to a second exemplary embodiment of the invention in a perspective illustration.

FIG. 3 shows a metallic plug connector component according to a third exemplary embodiment of the invention in a perspective illustration.

FIG. 4 shows a metallic plug connector component according to a fourth exemplary embodiment of the invention in a perspective illustration.

FIG. 5 shows a metallic plug connector component according to a fifth exemplary embodiment of the invention in a perspective illustration.

DETAILED WRITTEN DESCRIPTION OF THE PREFERRED EMBODIMENTS

Figure 6:
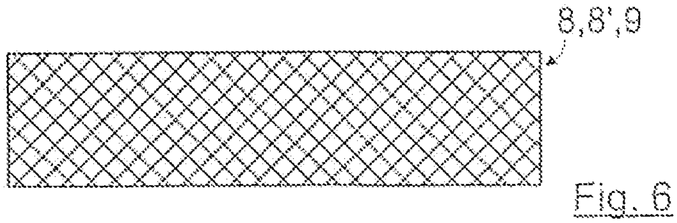
FIG. 6 shows an exemplary surface structure (cross-knurled structure) that can be used in the context of the invention.

This disclosure of the invention is submitted in furtherance of the Constitutional purposes of the US Patent Laws "to promote the progress of Science and the useful arts" (Article 1, Section 8).

FIG. 1 shows, in a perspective illustration, a metallic plug connector component 1 according to the invention and according to a first exemplary embodiment. The illustrated plug connector component 1 may, for example, be deformed in the course of a production process to form an electrical contact element, or to form a support sleeve of an electrical plug connector, which can result in the sleeve-shaped body illustrated in FIG. 9.

The plug connector component 1 has a main body 3 which has been coated with a coating 2 and which is formed in the manner of a plate, preferably from a metal. The main body 3 may in particular be a sheet composed of a high-grade metal, and the coating 2 may in particular be a metallic coating such as, but not limited to, a tin coating. The exemplary embodiments illustrate, by way of example, a main body 3 that has been coated on both sides, though this is not to be understood as limiting. In principle, it is also possible for only a single side of the main body 3, or for more than two sides of the main body 3, to be correspondingly coated.

The metallic plug connector component 1, or the main body 3, has been mechanically deformed in a processing portion 4. The processing portion 4 may have been deformed in any desired manner. The advantages of the invention however come to bear in particular if the processing portion 4 has been deformed to form at least one shaped edge, or bevel 5, formed at an edge or at a margin R of the plug connector component 1, or has a bevel 5, as illustrated, or has at least one projection 5' (cf. FIG. 10) and/or a transition radius in the processing portion 4. Preferably, the coating 2 adjoins the margin R, the projection 5' and/or the transition radius. The coating 2 may however also be spaced apart from the margin R or from the bevel 5, the projection 5' or the transition radius.

Width b of the bevel 5 may preferably be greater than half of a thickness d of the main body 3. The bevel angle α of the bevel 5 may be between 10° and 80°, preferably between 15° and 60°. Layer thickness s of the coating 2 may for example be approximately 1 μm.

Figure 10:
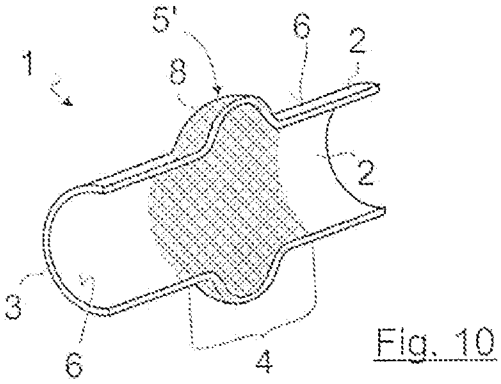
FIG. 10 shows a further sleeve-shaped metallic plug connector component according to an exemplary embodiment of the invention in a perspective sectional illustration.

In particular if the coating 2 has a lower compressive strength than the main body 3, a disadvantageous flow of the coating 2 on the main body 3 can occur during the deformation process, as a result of which the coating 2 can project beyond the margin R of the main body 3 (cf. the illustration of the prior art in FIG. 13) or at least partially detaches in some other way from the main body 3 (generally in a radial direction in the case of the projection 5' illustrated in FIG. 10). In the hitherto known prior art, if it has been sought to produce a highly precise metallic plug connector component 1, secondary processing has been imperative. The present invention is intended to remedy this.

In the context of the invention a surface 6, 7 of the coating 2 in the processing portion 4 has a defined surface structure 8. The formation of a chip from the plug connector component can be prevented in the proposed manner. It is thus possible to produce highly precise, deformed and coated metallic plug connector components 1 without cumbersome secondary processing.

In FIG. 1, by way of example, only the upper coating 2, at which the bevel 5 is formed, has the defined surface contour 8. The lower coating 2 is unprocessed (cf. the enlarged sectional illustration FIG. 1A). It is however preferable for all coatings 2, in particular in the processing portion 4, to have a corresponding surface structure 8, as indicated in FIGS. 11 and 12.

Figure 11:
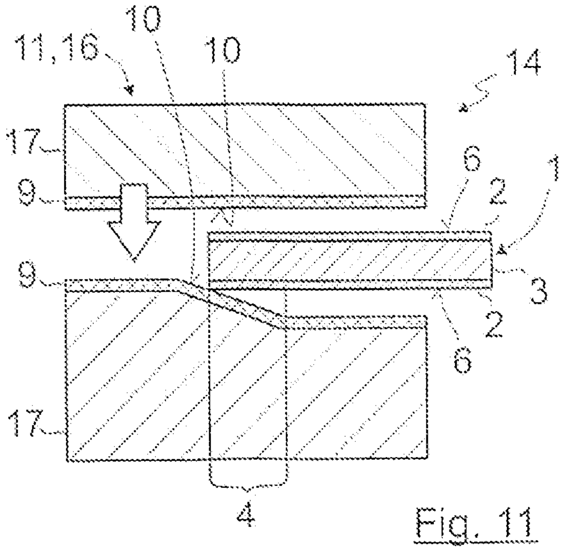
FIG. 11 shows a device for producing a metallic plug connector component, with an opened deformation tool, according to an exemplary embodiment of the invention before the deformation of the plug connector component.
Figure 12:
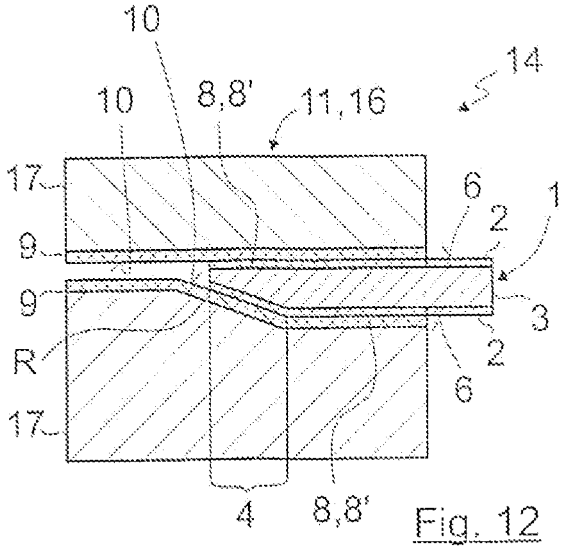
FIG. 12 shows the device of FIG. 11 in a closed state of the deformation tool, after the deformation of the plug connector component.

That surface of the coating 2 which has the surface structure 8 may in particular be an outer face 6, averted from the main body 3, of the coating 2, whereby a form-fitting connection can be established with a complementary negative form 9 of a stamping face 10 of a deformation tool 11 (cf. FIGS. 11 and 12).

That surface of the coating 2 which has the surface structure 8 may also be an inner face 7, facing toward the main body 3, of the coating 2. The main body 3 may finally have a complementary surface structure 8' (cf. the enlarged sectional illustration in FIG. 1A) in order to establish a form-fitting connection with the surface structure 8 of the coating 2.

Corresponding surface structures 8 on the outer face 6 and/or the inner face 7 of the coating 2 and on the main body 3 may be produced at the same time as the deformation process, as will be described in more detail herein.

Provision may be made whereby the surface structure 8, 8' is arranged entirely in the processing portion 4, as indicated in FIG. 1. It is however also possible in principle for the surface structure 8, 8' to be provided in the processing portion 4 only in certain portions (cf. FIG. 2), for the surface structure 8, 8' to be divided over multiple regions of the processing portion 4 (cf. FIG. 3), for a surface structure 8, 8' to be provided which extends beyond the processing portion 4 (cf. FIG. 4), or else for a surface structure 8, 8' to be provided which extends over the entire plug connector component 1 (cf. FIG. 5).

An ordered surface structure 8, 8' is preferably provided which has elevations 12 and depressions 13 (cf. In particular the enlarged sectional illustration in FIG. 1A). The roughness depth of the surface structure 8, 8' may preferably correspond at least to half of a layer thickness s of the coating 2.

Figure 7:
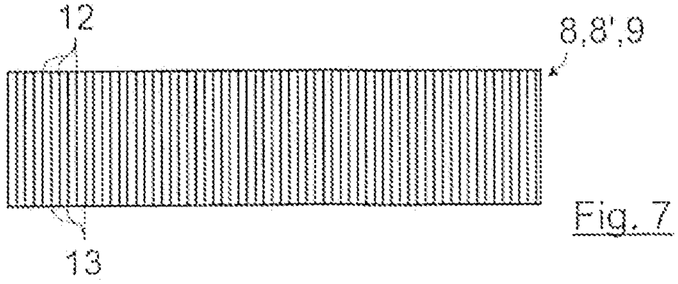
FIG. 7 shows a further surface structure (line structure) that can be used in the context of the invention.
Figure 8:
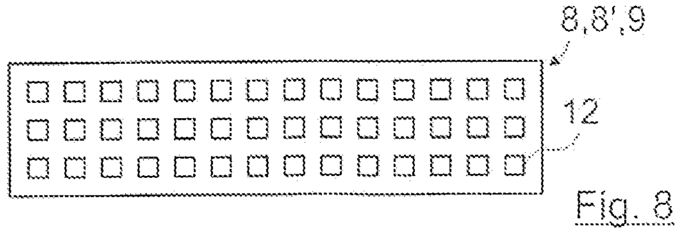
FIG. 8 shows a further surface structure (dotted pattern) that can be used in the context of the invention.

A cross-knurled structure as indicated in FIG. 6 has proven to be a particularly suitable surface structure 8, 8'. It is however possible in principle for any surface structures 8, 8' to be provided in order to prevent a flow of the coating 2 on the main body 3, for example also a line structure (cf. FIG. 7) or a dotted pattern by way of individual elevations 12 and/or depressions 13 (cf. FIG. 8). A disordered surface structure 8, 8' may also be provided.

Figure 9:
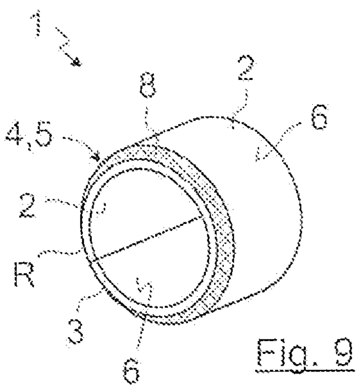
FIG. 9 shows, in a perspective sectional illustration, the metallic plug connector component of FIG. 1, which has been deformed to form a sleeve-shaped body.

As already mentioned, the metallic plug connector component 1 may also be merely an intermediate product that is deformed in a further production step, for example to form a sleeve-shaped body. Two examples of a sleeve-shaped metallic plug connector component 1 are illustrated in FIGS. 9 and 10—an initially still flat plug connector component 1 can be correspondingly bent. The plug connector component 1 may also be further processed in some other way, for example punched out of a larger flat body and/or provided with punched-out portions.

Aside from the formation of bevels 5 in the region of margins R or edges, the invention can in particular also be advantageously suitable for plug connector components 1 that have projections 5', bends or transition radii, for example in the manner of a (preferably, but not imperatively, annularly encircling) bulge 5', a flange or a convexity, as illustrated in FIG. 10. Such structures are for example known in the case of external-conductor contact elements of FAKRA plug connectors. The invention is also advantageous for use with a rib formed on (or in) the plug connector component 1, for example a rib extending in a longitudinal direction of the plug connector component 1 (not illustrated in the figures).

A suitable method and a device 14 for producing the plug connector component 1 will be described below on the basis of FIGS. 11 and 12.

In the context of the proposed method, provision is made whereby a main body face 15 of the main body 3 and/or an outer face 6, averted from the main body 3, of the coating 2 are processed in order to generate the defined surface structure 8, 8'.

Provision is furthermore made whereby the main body 3 that has been coated with the coating 2 is deformed in the course of a compressive deformation process in a processing portion 4, which has the surface structure 8, 8', by means of at least one deformation tool 11. In the exemplary embodiment, the deformation tool 11 for the compressive deformation and the processing tool 16 for the introduction of the surface structure 8, 8' are stamping punches 17, which can be used simultaneously for the deformation of the plug connector component 1 and for the introduction of the surface structure 8, 8'. The stamping surfaces 10 of the deformation tool 11 and of the stamping punch 17 may have been processed in advance (not illustrated) in order to generate a negative form 9 of the surface structure 8, 8'. Thus, if the stamping punches 17 are advanced toward one another during the deformation process, the negative form 9 of the surface structure 8 is stamped at least into the outer face 6 of the coating 2 at the same time as the compressive deformation. The stamping is however preferably performed through the coating 2 into the main body face 15 of the main body 3, in order to establish both a form fit of the coating 2 with respect to the stamping punch 17 and a form fit of the coating 2 with respect to the main body 3.

Figure 13:
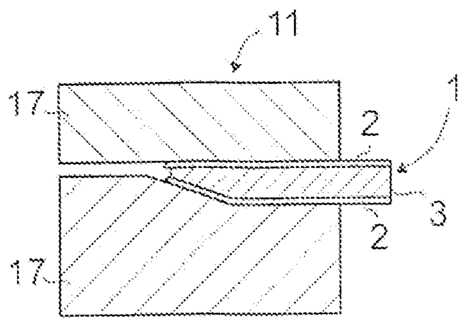
Fig. 13 PRIOR ART
FIG. 13 shows a device for producing a metallic plug connector component, having a deformation tool according to the prior art.

In contrast to the prior art illustrated in FIG. 13, a flow of the coating 2 beyond the margin R of the main body 3 is reliably prevented.

Operation

Having described the structure of my metallic plug connector component, and method and device for producing a metallic plug connector component, its operation is briefly described.

A principal object of the present invention is a metallic plug connector component (1) comprising: a main body (3); a coating (2) covering the main body (3); and wherein the main body is mechanically deformed at a processing portion (4); and wherein a surface (6, 7) of the coating (2) in the processing portion (4) has a defined surface structure (8) at least in certain portions of the surface (6,7).

A further object of the present invention is a metallic plug connector component (1) wherein the coating (2) adjoins a margin (R) or a projection (5') or a transition portion that is formed between two portions with different radii.

A further object of the present invention is a metallic plug connector component (1) wherein the main body (3) is formed in a manner of a plate from a metal.

A further object of the present invention is a metallic plug connector component (1) wherein the coating (2) covering the main body (3) has a compressive strength that is lower than a compressive strength of the main body (3).

A further object of the present invention is a metallic plug connector component (1) wherein the coating (2) covering the main body (3) is a metallic coating.

A further object of the present invention is a metallic plug connector component (1) wherein the main body (3) is coated on at least two mutually averted sides with the coating (2); and wherein the coating (2) on the at least two mutually averted sides is provided with the surface structure (8).

A further object of the present invention is a metallic plug connector component (1) wherein, the processing portion (4) is deformed to form at least one bevel (5) at a margin (R) of the metallic plug connector component (1).

A further object of the present invention is a metallic plug connector component (1) wherein that surface of the coating (2) which has the surface structure (8) is an outer face (6) of the coating (2), that is averted from the main body (3), and wherein the surface structure (8) establishes a form-fitting connection with a complementary negative form (9) of a stamping face (10) of a deformation tool (11).

A further object of the present invention is a metallic plug connector component (1) wherein that surface of the coating (2) which has the surface structure (8) is an inner surface (7) of the surface coating (2), facing toward the main body (3), of the metallic plug connector component (1); and wherein the main body (3) of the metallic plug connector component (1) has a complementary surface structure (8') to establish a form-fitting connection with the surface structure (8) of the surface coating (2).

A further object of the present invention is a metallic plug connector component (1) wherein the surface structure (8) of the coating (2) is an ordered structure.

A further object of the present invention is a metallic plug connector component (1) wherein a roughness depth of the surface structure (8) of the coating (2) is at least half of a layer thickness (s) of the coating (2).

A further object of the present invention is a method for producing a metallic plug connector component (1), comprising the steps: providing a main body (3) for the metallic plug connector component (1) that has a main body face (15) which has been coated with a coating (2), the coating (2) having an outer face (6) that is averted from the main body (3); processing at least one of the main body face (15) of the main body (3), or the outer face (6) of the coating (2) to generate a defined surface structure (8) on a processing portion (4) of the coated main body (3); providing a deformation tool (11); and performing with the deformation tool (11), a compressive deformation of the processing portion (4) of the coated main body (3) that has the defined surface structure (8).

A further object of the present invention is a method for producing a metallic plug connector component (1) wherein the defined surface structure (8, 8') is stamped into an outer face (6) of the surface coating (2), during the compressive deformation.

A further object of the present invention is a method for producing a metallic plug connector component (1) wherein the processing portion (4) adjoins a margin (R) of the main body (3), and wherein; the main body (3) is deformed responsive to the compressive deformation so that a bevel (5) is formed at the margin (R).

A further object of the present invention is a device (14) for producing a metallic plug connector component (1) which has a main body (3) and which has been coated with a coating (2), comprising: a processing tool (16) that is configured to generate a defined surface structure (8, 8') in a main body face (15) of the main body (3) and/or in an outer face (6) of the coating (2) of the main body (3); and a deformation tool (11) for performing compressive deformation of a processing portion (4) of the main body (3) that has been coated with the coating (2); and the processing portion (4) has the defined surface structure (8, 8').

A further object of the present invention is a metallic plug connector component (1) wherein the main body (3) is formed in the manner of a sheet from a high-grade metal.

A further object of the present invention is a metallic plug connector component (1) wherein the coating (2) covering the main body (3) is a tin coating.

A further object of the present invention is a metallic plug connector component (1) wherein the surface structure (8) of the coating (2) is a cross-knurled structure.

A still further object of the present invention is a method for producing a metallic plug connector component (1) wherein the metallic plug connector component (1) forms an electrical contact element, or support sleeve, of an electrical plug connector.

An even still further object of the present invention is a method for producing a metallic plug connector component (1) wherein the defined surface structure (8, 8') is stamped through the surface coating (2) and into the main body (3) of the metallic plug connector component (1), at the same time as the compressive deformation.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. A metallic plug connector component (1), comprising:

a main body (3);

a coating (2) covering the main body (3); and wherein the main body is mechanically deformed at a processing portion (4); and wherein a surface (6, 7) of the coating (2) in the processing portion (4) has a defined surface structure (8) at least in certain portions of the surface (6,7); and wherein the defined surface structure (8, 8') is stamped through the surface coating (2) and into the main body (3) of the metallic plug connector component (1), at the same time as the deformation.

2. The metallic plug connector component (1) as claimed in claim 1, and wherein the coating (2) adjoins a margin (R) or a projection (5') or a transition portion that is formed between two portions with different radii.

3. The metallic plug connector component (1) as claimed in claim 1, and wherein the main body (3) is formed in a manner of a plate from a metal.

4. The metallic plug connector component (1) as claimed in claim 1, and wherein the coating (2) covering the main body (3) has a compressive strength that is lower than a compressive strength of the main body (3).

5. The metallic plug connector component (1) as claimed in claim 1, and wherein the coating (2) covering the main body (3) is a metallic coating.

6. The metallic plug connector component (1) as claimed in claim 1, and wherein the main body (3) is coated on at least two mutually averted sides with the coating (2); and wherein the coating (2) on the at least two mutually averted sides is provided with the surface structure (8).

7. The metallic plug connector component (1) as claimed in claim 1, and wherein, the processing portion (4) is deformed to form at least one bevel (5) at a margin (R) of the metallic plug connector component (1).

8. The metallic plug connector component (1) as claimed in claim 1, and wherein that surface of the coating (2) which has the surface structure (8) is an outer face (6) of the coating (2), that is averted from the main body (3), and wherein the surface structure (8) establishes a form-fitting connection with a complementary negative form (9) of a stamping face (10) of a deformation tool (11).

9. The metallic plug connector component (1) as claimed in claim 1, and wherein that surface of the coating (2) which has the surface structure (8) is an inner surface (7) of the surface coating (2), facing toward the main body (3), of the metallic plug connector component (1); and, wherein the main body (3) of the metallic plug connector component (1) has a complementary surface structure (8') to establish a form-fitting connection with the surface structure (8) of the surface coating (2).

10. The metallic plug connector component (1) as claimed in claim 1, and wherein the surface structure (8) of the coating (2) is an ordered structure.

11. The metallic plug connector component (1) as claimed in claim 1, and wherein a roughness depth of the surface structure (8) of the coating (2) is at least half of a layer thickness (s) of the coating (2).

12. The metallic plug connector component (1) as claimed in claim 1, and wherein the main body (3) is formed in the manner of a sheet from a high-grade metal.

13. The metallic plug connector component (1) as claimed in claim 1, and wherein the coating (2) covering the main body (3) is a tin coating.

14. The metallic plug connector component (1) as claimed in claim 1, and wherein the surface structure (8) of the coating (2) is a cross-knurled structure.

15. The metallic plug connector component (1) as claimed in claim 1, and wherein the metallic plug connector component (1) forms an electrical contact element or support sleeve of an electrical plug connector.

16. A method for producing a metallic plug connector component (1) comprising the steps:

providing a main body (3) for the metallic plug connector component (1) that has a main body face (15) which has been coated with a coating (2), the coating (2) having an outer face (6) averted from the main body (3);

processing at least one of the main body face (15) of the main body (3) or the outer face (6) of the coating (2), to generate a defined surface structure (8) on a processing portion (4) of the coated main body (3);

providing a deformation tool (11); and performing with the deformation tool (11), a compressive deformation of the processing portion (4) of the coated main body (3) that has the defined surface structure (8); and wherein the defined surface structure (8, 8') is stamped through the surface coating (2) and into the main body (3) of the metallic plug connector component (1), at the same time as the compressive deformation.

17. The method for producing a metallic plug connector component (1) as claimed in claim 16, and wherein the defined surface structure (8, 8') is stamped into an outer face (6) of the surface coating (2), during the compressive deformation.

18. The method for producing a metallic plug connector component (1) as claimed in claim 16, and wherein the processing portion (4) adjoins a margin (R) of the main body (3), and wherein;

the main body (3) is deformed responsive to the compressive deformation so that a bevel (5) is formed at the margin (R).

19. A device for producing a metallic plug connector component which has a main body and which has been coated with a coating, comprising: a processing tool that is configured to generate a defined surface structure in a main body face of the main body and/or in an outer face of the coating of the main body; and a deformation tool for performing compressive deformation of a processing portion of the main body that has been coated with the coating; and the processing portion has the defined surface structure; and wherein the defined surface structure is stamped through the surface coating and into the main body of the metallic plug connector component, at the same time as the compressive deformation.

* * * * *